(12) United States Patent
Leeson et al.

(10) Patent No.: US 11,650,376 B2
(45) Date of Patent: May 16, 2023

(54) OPTICAL FIBER CONNECTORS

(71) Applicant: PPC BROADBAND FIBER LTD., Woodbridge (GB)

(72) Inventors: Kim Leeson, Ipswich (GB); Shaun Trezise, Aldeburgh (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 0 days.

(21) Appl. No.: 17/152,779

(22) Filed: Jan. 19, 2021

(65) Prior Publication Data

US 2021/0223485 A1 Jul. 22, 2021

Related U.S. Application Data

(60) Provisional application No. 62/962,242, filed on Jan. 17, 2020.

(51) Int. Cl.
*G02B 6/38* (2006.01)

(52) U.S. Cl.
CPC ......... *G02B 6/3869* (2013.01); *G02B 6/3831* (2013.01); *G02B 6/3893* (2013.01)

(58) Field of Classification Search
None
See application file for complete search history.

(56) References Cited

U.S. PATENT DOCUMENTS

| | | | |
|---|---|---|---|
| 5,809,192 A | 9/1998 | Manning et al. | |
| 5,946,436 A * | 8/1999 | Takashi | G02B 6/3869 385/60 |
| 6,652,156 B2 * | 11/2003 | Shinagawa | G02B 6/3871 385/77 |
| 6,916,119 B2 | 7/2005 | Okochi et al. | |
| 8,858,090 B2 * | 10/2014 | Henke | G02B 6/3851 385/60 |
| 9,022,670 B2 * | 5/2015 | Yu | G02B 6/3893 385/84 |
| 9,182,567 B2 * | 11/2015 | Mullaney | G02B 6/38875 |
| 9,927,581 B1 * | 3/2018 | Rosson | G02B 6/3821 |
| 2010/0215321 A1 | 8/2010 | Jenkins | |
| 2018/0329157 A1 * | 11/2018 | Crawford | G02B 6/3897 |
| 2022/0236496 A1 | 7/2022 | Leeson et al. | |
| 2023/0055015 A1 | 2/2023 | Leeson et al. | |

OTHER PUBLICATIONS

Search Report dated Jun. 7, 2021 in corresponding International Application No. PCT/IB2021/000014, 3 pages.
Written Opinion dated Jun. 7, 2021 in corresponding International Application No. PCT/IB2021/000014, 6 pages.

* cited by examiner

*Primary Examiner* — Rhonda S Peace
(74) *Attorney, Agent, or Firm* — MH2 Technology Law Group LLP

(57) ABSTRACT

An optical fiber connector sub-assembly for an optical fiber connector including a ferrule configured to hold an optical fiber therein along an axis of the connector, a ferrule holder configured to hold the ferrule at a front portion of the connector, a ferrule housing including a front portion configured to slidingly receive the ferrule holder and a rear portion terminating a fiber optic cable that includes the optical fiber, and an inner housing configured to fixed coupled with the ferrule housing. The ferrule is configured to terminate the optical fiber. The ferrule holder, the ferrule housing, and the inner housing are configured to be rotatably fixed to one another. The ferrule holder is configured to slide axially relative to the inner housing.

27 Claims, 12 Drawing Sheets

OPTICAL FIBER CONNECTORS

CROSS REFERENCE TO RELATED APPLICATION

This application claims the benefit of U.S. Provisional Application No. 62/962,242, filed Jan. 17, 2020, the disclosure of which is hereby incorporated by reference herein in its entirety.

BACKGROUND

The present disclosure relates to optical fiber connectors, for example SC-style connectors, and to a method of forming and using such connectors.

The mechanical tolerances involved in terminating single mode optical fiber are much tighter than those for multimode optical fiber. Therefore, while it is quite common for multimode optical fiber be terminated at the point of use, for example, at a user's premises or at an outside junction box, in most product applications, single mode optical fiber is not terminated in the field. When single mode fiber must be terminated in the field, then it can take a skilled technician between about 15 to 20 minutes to splice fibers together either by using a V-groove clamp or expensive fusion welding equipment.

Single mode fiber is therefore often provided in a range of different lengths, pre-terminated at both ends with a connector plug ready to plug into a matching receptacle. Commonly, eight or twelve single mode optical fibers may be bundled together in an optical fiber cable having an outer protective tube inside of which the optical fibers run.

An example of such a connector is the "Subscriber Connector," or SC connector, originally developed by NTT®. SC connectors have convenient push/pull style mating, and are approximately square in cross-section and with a 2.5 mm diameter ferule at the termination of the optical fiber, surrounded by a plastic housing for protection. SC connectors are available in single or duplex configurations. The SC connector latches into a matching socket in a simple push motion. The push-pull design includes a spring against which the ferrule slides within a plastic inner housing. This arrangement provides a reliable contact pressure at the ferrule end and resists fiber end face contact damage of the optical fiber during connection. The connector can be quickly disconnected by first pulling back an outer housing, which is slidable relative to the inner housing, to disengage a latch inside socket between the socket and the inner housing, before pulling the optical fiber connector from the socket. Until the latch is thus disengaged, the latch prevents withdrawal of the connector when the optical fiber cable is pulled in a direction away from the socket.

It is important to avoid bending optical fiber around curves having too sharp a bend radius, as this will increase optical losses and can permanently damage the optical fiber. Optical fiber cables are therefore often routed inside a protective outer tube or conduit, which can have minimum bend-limiting properties. Protective bend limiting conduits normally have an outer diameter of 8 mm or 10 mm tubes. The cross-section of a standard SC connector has dimensions of about 7 mm×9 mm, and even a small form factor SC connector is too large to fit inside the inner diameter of a typical protective conduit.

Conventional optical fiber connectors comprise a rigid pushable structure to allow for limited movement of the connector parts while being pushed down stretches of duct. However, due to their rigid structure, conventional optical fiber connectors suffer from signal degradation when weight is added to the cable and the connector while the connector is transmitting a signal.

It may be desirable to provide an optical fiber connector with improved signal transmission capability.

SUMMARY

In accordance with various aspects of the disclosure, an optical fiber connector sub-assembly for an optical fiber connector including a ferrule configured to hold an optical fiber therein along an axis of the connector, a ferrule holder configured to hold the ferrule at a front portion of the connector, a ferrule housing including a front portion configured to slidingly receive the ferrule holder and a rear portion terminating a fiber optic cable that includes the optical fiber, and an inner housing configured to fixed coupled with the ferrule housing. The ferrule is configured to terminate the optical fiber. The ferrule holder, the ferrule housing, and the inner housing are configured to be rotatably fixed to one another. The ferrule holder is configured to slide axially relative to the inner housing.

In some aspects, the front portion includes a cylindrical portion and two arms extending from a forward end of the cylindrical portion, and the ferrule holder includes a base portion having two notches configured to receive the two arms.

According to various aspects, an outer surface of the front portion includes axially extending notches configured to receive projections extending radially inward from an inner wall of the inner housing.

According to some aspects, the ferrule holder and the ferrule housing are configured to move axially relative to one another along the connector axis between limits defined by an interaction between the ferrule housing and the ferrule holder. In various aspects, a spring is provided between the ferrule holder and the ferrule housing and configured to bias the ferrule away from the ferrule housing along the connector axis.

In various aspects, outermost surfaces of the ferrule housing and the ferrule holder, relative to the connector axis, lie on a common cylindrical envelope.

According to various aspects, a Subscriber Connection (SC)-type optical fiber connector includes one of the aforementioned optical fiber connector sub-assemblies and an outer housing. The inner housing defines a receptacle for a socket to receive a projecting portion of the ferrule. The spring provided between the ferrule holder and the ferrule housing is configured such that the projecting portion of the ferrule is spring biased along the connector axis towards the receptacle of the inner housing. The inner housing is configured to be engaged within the outer housing, the inner housing and the outer housing being configured to move relative to each other along the connector axis between limits defined by an interaction between the inner housing and the outer housing in order to provide SC-style push/pull engagement/disengagement with a mating optical fiber socket.

In some aspects, of the SC-type optical fiber connector, the ferrule is configured to be rotationally fixed with respect to the ferrule holder about the connector axis, and the ferrule holder is configured to be rotationally aligned with respect to the outer housing so that the rotational orientation of the ferrule with respect to the outer housing can be set during assembly of the connector at one of one or more predefined rotational orientations.

In various aspects of the SC-type optical fiber, a first rotational key is provided between the ferrule holder and the ferrule housing and a second rotational key is provided between the ferrule housing and the inner housing.

BRIEF DESCRIPTION OF THE DRAWINGS

Embodiments of the invention will now be further described, by way of example only, and with reference to the accompanying drawings, in which.

DETAILED DESCRIPTION OF EMBODIMENTS

Figure 1:
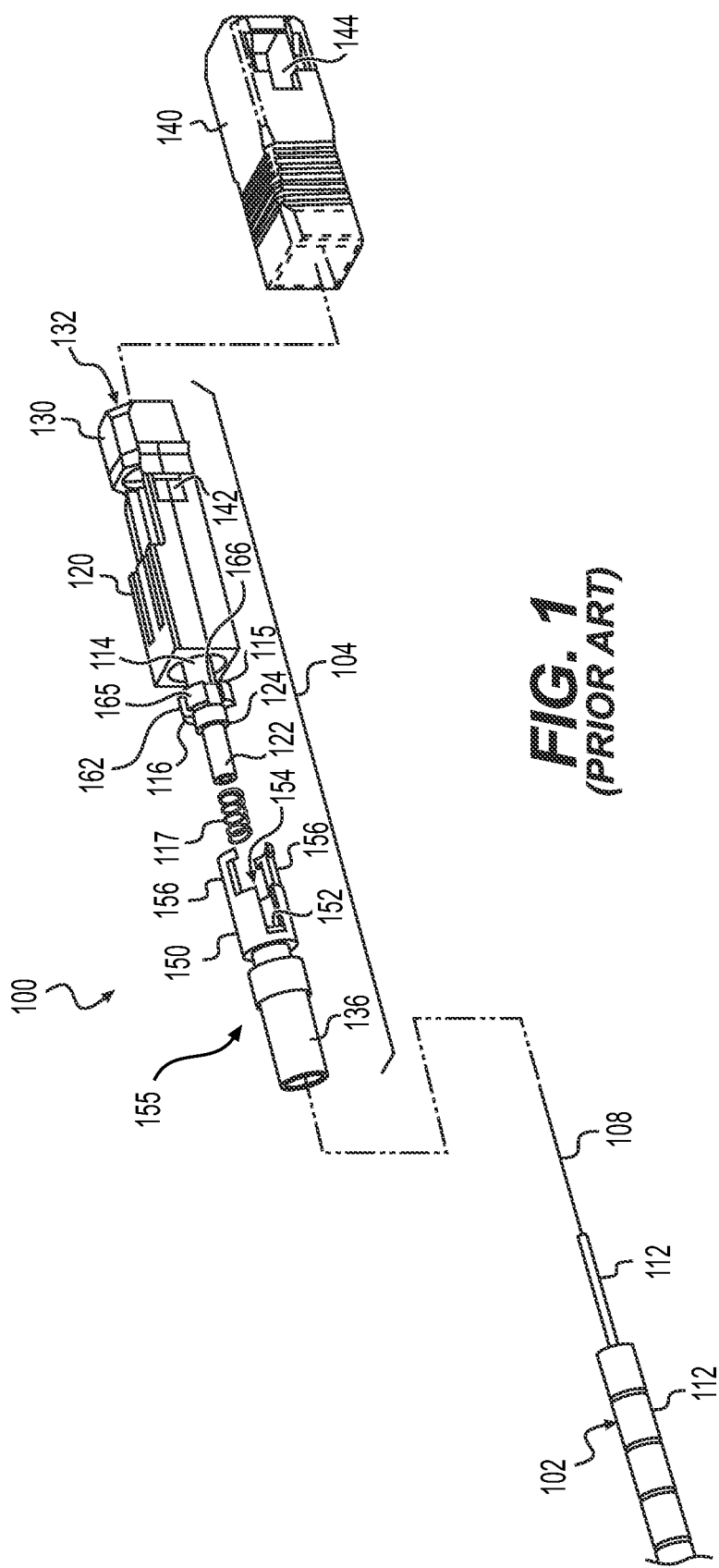
FIG. 1 is an exploded perspective view of an exemplary prior art SC connector.
Figure 2:
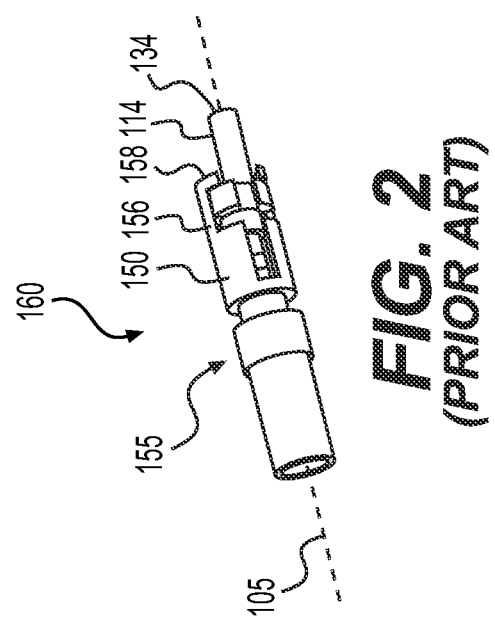
FIG. 2 is a perspective view of the optical fiber connector sub-assembly of FIG. 1 when assembled.
Figure 3:
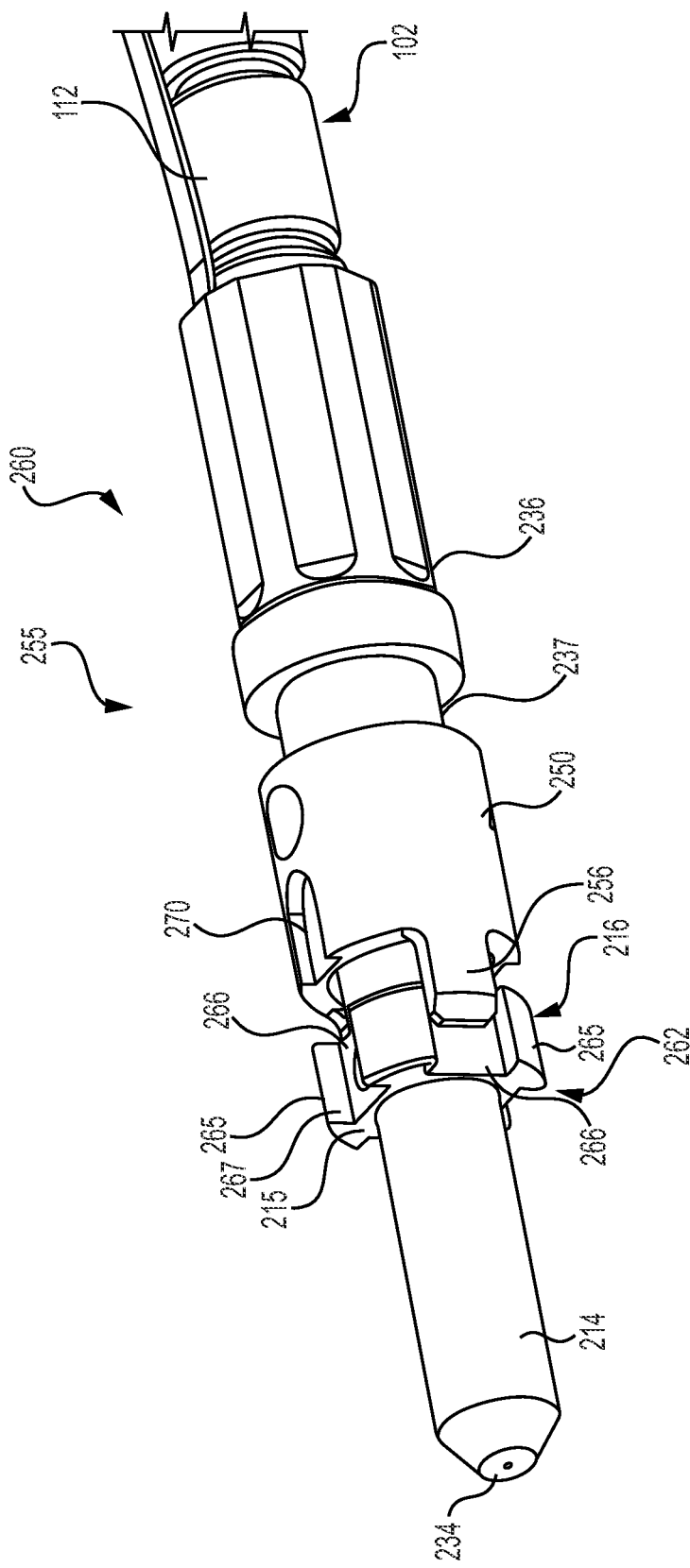
FIG. 3 is a perspective view of an exemplary optical fiber connector sub-assembly in accordance with various aspects of the disclosure terminating an optical fiber cable.

FIGS. 1 and 2 show an exemplary prior art SC connector, such as the connectors disclosed in U.S. patent application Ser. No. 15/887,925, the disclosure of which is incorporated herein by reference. The exemplary SC connector 100 includes an optical fiber cable 102, a ferrule housing sub-assembly 104, and an outer housing 140 to provide SC-style push/pull engagement/disengagement with a mating optical fiber socket (not shown).

The cable 102 holds an optical fiber 108, for example, a single strand of 125 µm diameter single mode optical fiber, protected by primary and secondary buffering layers 110, about 900 µm in diameter, and an outer sheath 112, typically 3 mm to 5 mm in diameter. The optical fiber 108 is terminated by a ferrule 114 in a manner well-known to those skilled in the art, and defines a ferrule axis 105 that extends centrally through the SC connector 100.

The ferrule housing sub-assembly 104 includes the cylindrical ceramic ferrule 114, a ferrule basket 116 in which the ferrule is seated, a helical spring 117, a ferrule housing 155, and an inner housing 120. The ferrule housing 155 includes a cylindrical sleeve portion 136 and a ferrule basket carrier portion 150. The ferrule basket carrier portion 150 may include longitudinal slots 180 along the lengths of their outer surfaces that are keyed to projections (not shown) on an inner surface of the inner housing 120 to prevent the ferrule housing 155 from rotating relative to the inner housing 120.

The ferrule basket 116 has a base 115 and a cylindrical stem 122 which extends from the base 115 in an axial direction away from the ferrule 114 towards the cylindrical sleeve portion 136, which is used to make a crimp connection around the optical fiber cable sheathing 112. The spring 117 is seated around the stem 122 between an annular shoulder 124 on the ferrule basket 116 and an annular surface 152 within a cylindrical recess 154 of the ferrule basket carrier portion 150. The stem 122 is slidably seated in a bore of the ferrule housing 155.

During assembly, the ferrule basket 116 and seated ferrule 114 are inserted axially into the recess 154 of the ferrule basket carrier portion 150. The ferrule basket carrier portion 150 has a pair of arms 156 that extend axially forwards of the stem 122 on opposite sides of the ferrule basket 116. Two pairs of curved fingers 158 are provided, each pair extending in opposite circumferential directions at the end of each arm 156. The fingers 158 extend transversely to the length of the arms 156 partially around the circumference of a portion of the ferrule 114 nearest a base 115.

The ferrule base 115 has four cycles of crenellations 162 spaced symmetrically around the circumference of the base and which provide four corresponding channels that extend parallel to the optical fiber axis 105. These crenellations 162 are in the form of alternating radially high 165 and low 166 cylindrically shaped regions with the circumferential and axial extent of each of the high 165 and low 166 regions being the same. The high 165 and low 166 regions are separated by steps 167 that extend in a radial direction. The arms 156 are seated in opposite radially low regions 166 in a sliding fit with the adjacent high regions 165, and reach axially forward of the base 115 and crenellations 162 so that the fingers 158 engage with the intervening radially high regions 165 on a side 161 of the base 115 opposite the annular surface 124 against which the spring 117 is engaged.

The aforementioned arrangement permits a degree axial movement of the ferrule basket carrier portion 150, with movement being therefore limited in one direction by the compression of the spring 117 between the two annular surfaces 124, 152 and in the other axial direction by the contact of the fingers 158 with the radially high regions 165 of the crenellations 162 on the base 115 of the ferrule basket 116. As can be seen from the drawings, the ferrule holder base 115 and ferrule basket carrier portion 150 also have a common cylindrical outer envelope.

The inner housing 120 has a forward portion 130 that coaxially extends around the axially projecting ferrule 114 to define a receptacle 132 for a socket (not shown) to receive a projecting portion of the ferrule 114.

The ferrule basket 116 is free to move backwards inside the ferrule basket carrier portion 150 and the inner housing 120 when an end face 134 of the ferrule 114 comes into contact with a similar end face (not shown) of another optical fiber ferrule when making an optical connection.

The ferrule basket carrier portion 150 has a central aperture (not shown) through which the optical fiber 108 and buffering 110 pass, and has in a rear-most portion the sleeve 136 configured to receive and be crimped to the cable sheathing 112. In some aspects, a strain-relief sleeve (not shown), for example, a boot, may be provided around the junction of the optical fiber cable 102 and the ferrule housing sub-assembly 104.

An outer housing 140 is press-fitted axially over the assembled ferrule housing sub-assembly 104. Once the inner housing 120 and outer housing 140 are engaged together, the inner and outer housings are relatively moveable with respect to each other along the ferrule axis 105 between limits defined by an interaction between the inner housing 120 and the outer housing 140 provided by projections 142 on a pair of opposite sides of the inner housing 120 and a pair of apertures 144 in the outer housing. The projections 142 and apertures 144 interact with sprung features inside a matching socket (not shown) to provide SC-style push/pull engagement/disengagement configured to mate with an optical fiber socket.

The rotational orientation of the ferrule basket carrier portion 150 may be set at one of four orientations relative to the ferrule 114 in the ferrule basket 116 owing to the seating of the arms 156 in the crenellations. In this way, a first rotational key is provided between the ferrule basket 116 and the ferrule basket carrier portion 150 such that the ferrule basket 116 and the ferrule basket carrier portion 150 are rotatably fixed to one another (i.e., are not rotatable relative to one another).

The optical fiber 108 is therefore terminated in a sub-assembly referred to herein as an optical fiber connector sub-assembly 160, as illustrated in FIG. 2. During assembly of the optical fiber connector sub-assembly 160, the arms 156 and the fingers 158, which each have a chamfered taper 164 on an inner forwards surface, flex outwardly over the base 115 of the ferrule holder 114 until the fingers 158 snap radially inwards into engagement with the forwards surface 161 of the ferrule basket base 115.

In both cases, the resulting optical fiber connector sub-assembly 160 is therefore mechanically whole or integral, both as regards the components forming the sub-assembly and as regards the mechanical connection of the sub-assembly to the optical fiber cable 102. The sub-assembly cannot come apart without first prizing the fingers 158 back over the ferule basket base 115. The ferrule basket carrier portion 150 has an outer diameter which is preferably no more than that of the widest portion of the ferrule basket 116, i.e. the ferrule basket base 115.

After the insertion has been performed, the assembly of the SC-type optical fiber connector 100 is completed as follows. The inner housing 120 is inserted in an axial direction over the projecting ferrule 114 and surrounding ferrule basket carrier portion 150. The external shape of the inner housing 120 where this interacts with the outer housing 140 is the same as with conventional connectors. The outer housing 140 therefore is snap-fitted over the inner housing 120, after which the SC-type connector 100 is fully compatible with conventional connectors and conventional optical fiber sockets.

Referring now to FIGS. 3-7, an exemplary optical fiber connector 200, for example, an SC-type connector, in accordance with various aspects of the disclosure is illustrated and described. The connector 200 includes an optical fiber cable 102, a ferrule housing sub-assembly 204, and an outer housing (not shown) to provide SC-style push/pull engagement/disengagement with a mating optical fiber socket (not shown).

The ferrule housing sub-assembly 204 includes a cylindrical ceramic ferrule 214, a ferrule basket 216 in which the ferrule 214 is seated, a helical spring 217, a ferrule housing 255, and an inner housing 220. The ferrule housing 255 includes a front tube portion 250, a rear tube portion 236, and a connecting tube portion 237 between the front and rear tube portions 250, 236. The connecting tube portion 237 has a smaller outside diameter than the adjacent front tube portion 250 and rear tube portion 236

The ferrule basket 216 has a base 215 and a cylindrical stem 222 which extends from the base 215 in an axial direction away from the ferrule 214 towards the rear tube portion 236, which is used to make a crimp connection around the optical fiber cable sheathing 212. The spring 217 is seated around the stem 222 between an annular shoulder 224 on the ferrule basket 216 and an annular surface 252 within a cylindrical recess 254 at a rearward end of the front tube portion 250. The stem 222 slidably extends through an opening 239 at the rearward end of the front tube portion 250 and into the connecting tube portion 237. A rearward end of the stem 222 includes a flared end portion 223. The flared end portion 223 has a diameter greater than a diameter of the opening 239 such that forward axial movement of the stem 222 relative to the ferrule housing 255 is limited by interaction of the flared end portion 223 with a rearward-facing shoulder 241 in the connecting tube portion 237 at the opening 239.

The ferrule basket 216 is configured to be inserted axially into the recess 254 of the front tube portion 250. The front tube portion 250 has a pair of diametrically opposed arms 256 that extend axially forward of the stem 222 on opposite sides of the ferrule basket 216. The ferrule base 215 has four cycles of crenellations 262 spaced symmetrically around the circumference of the base and which provide four corresponding channels that extend parallel to the optical fiber axis 205. These crenellations 262 are in the form of alternating radially high 265 and low 266 cylindrically shaped regions with the circumferential and axial extent of each of the high 265 and low 266 regions being the same. The high 265 and low 266 regions are separated by steps 267 that extend in a radial direction. The arms 256 are seated in two opposite radially low regions 266 in a sliding fit with the adjacent high regions 265.

The aforementioned arrangement permits a degree of axial movement of the ferrule basket 216 and ferrule 214 relative to the ferrule housing 255, with movement being therefore limited in one direction by the compression of the spring 217 between the two annular surfaces 224, 252 and in the other axial direction by the contact of the flared end portion 223 of the stem 222 with the rearward-facing shoulder 241 in the connecting tube portion 237. As can be seen from the drawings, the ferrule holder base 215 and front tube portion 250 also have a common cylindrical outer envelope.

The inner housing 220 has a forward portion 230 that coaxially extends around the axially projecting ferrule 214 to define a receptacle 232 for a socket (not shown) configured to receive a projecting portion of the ferrule 214. The ferrule basket 216 is free to move backwards inside the front tube portion 250 and the inner housing 220 when an end face 234 of the ferrule 214 comes into contact with a similar end face (not shown) of another optical fiber ferrule when making an optical connection.

Figure 4:
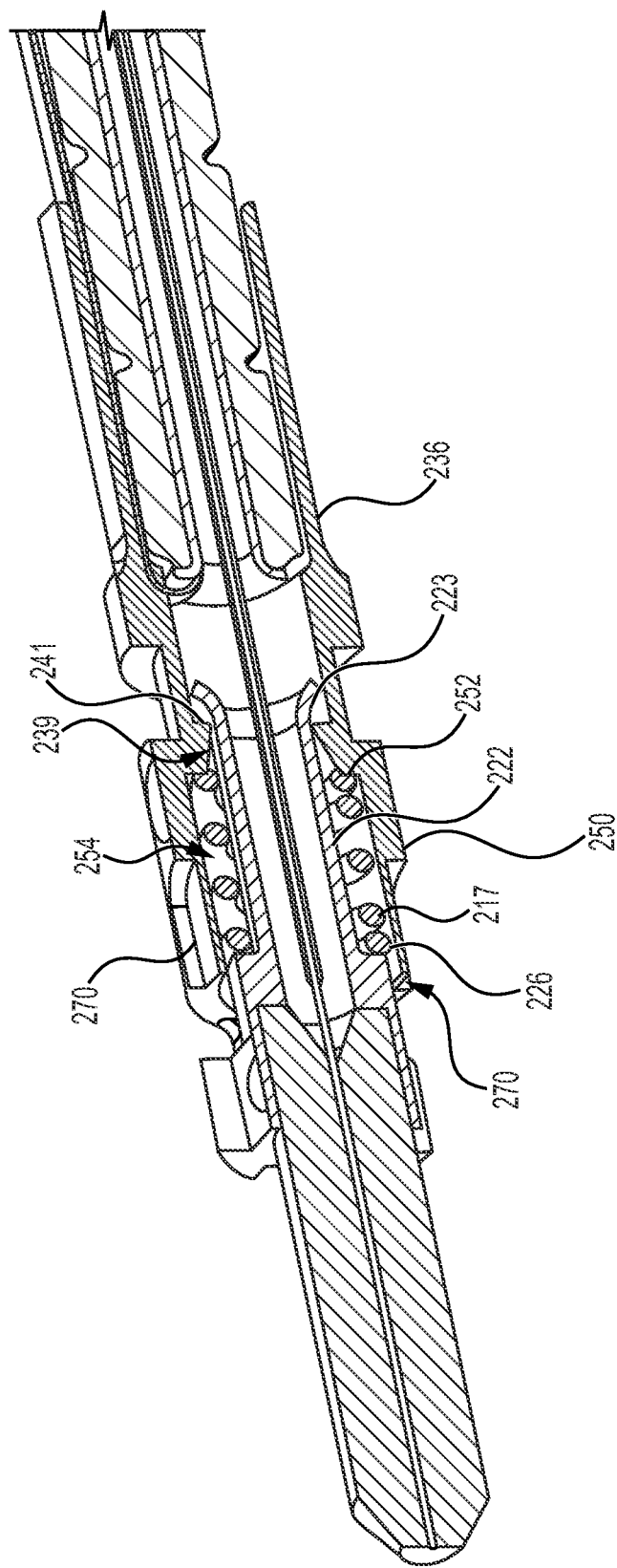
FIG. 4 is a perspective cross-sectional view of the optical fiber connector sub-assembly of FIG. 3.
Figure 5:
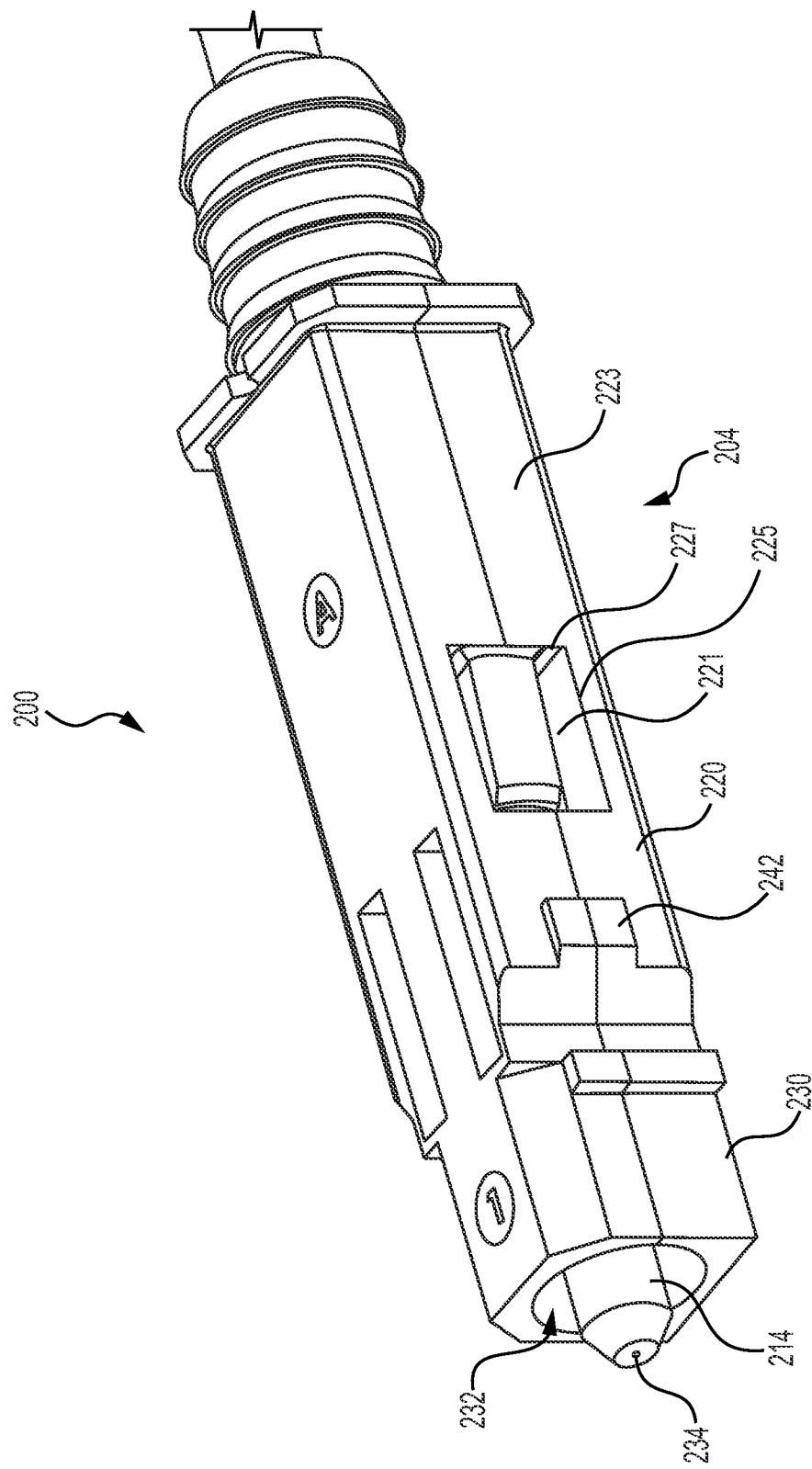
FIG. 5 is a perspective view of an exemplary SC connector including the optical fiber connector sub-assembly of FIG. 3.

The front tube portion 250 of the ferrule housing 255 may include longitudinal notches 270 in its top and bottom outer surfaces that are keyed to axially-extending projections 272 (FIGS. 6 and 7) on top and bottom inner surfaces of the inner housing 220 to prevent the ferrule housing 255 from rotating relative to the inner housing 220. As shown in FIG. 4, the notches 270 are axially aligned with two of the low regions 266 of the crenellations 262 that are not occupied by the arms 256. The depth of the notches 270 is less than a depth of the low regions 266 relative to outer profiles of the front tube portion 250 and the high regions 265 of the ferrule base 215, which are substantially the same as one another.

Figure 6:
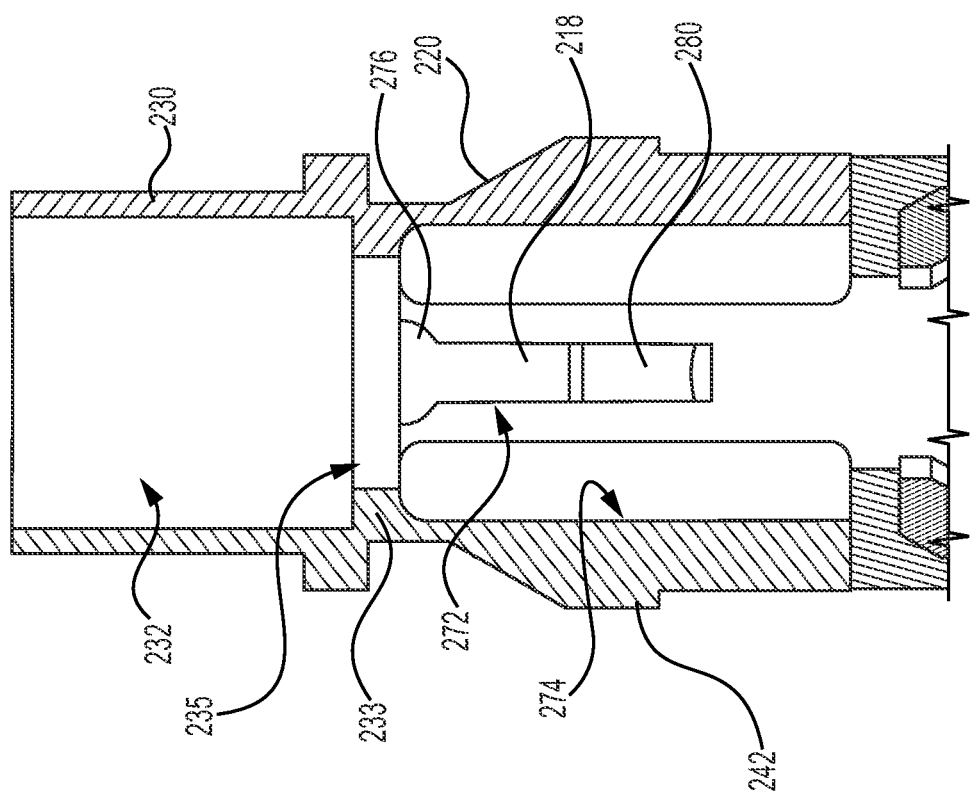
FIG. 6 is a top cross-sectional view of the ferrule housing of the optical fiber connector sub-assembly of FIG. 3.
Figure 7:
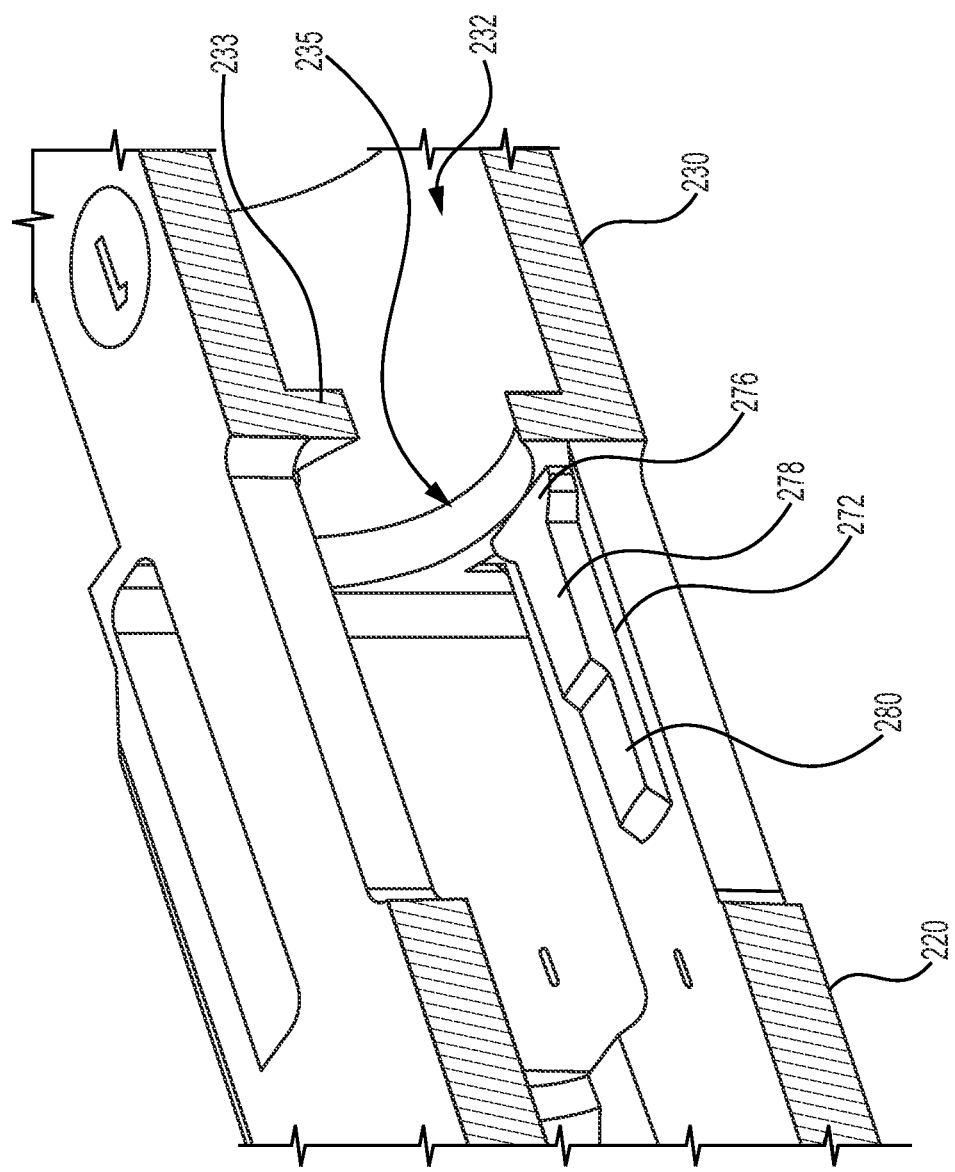
FIG. 7 is a perspective cross-sectional view of the ferrule housing of FIG. 6.
Figure 8:
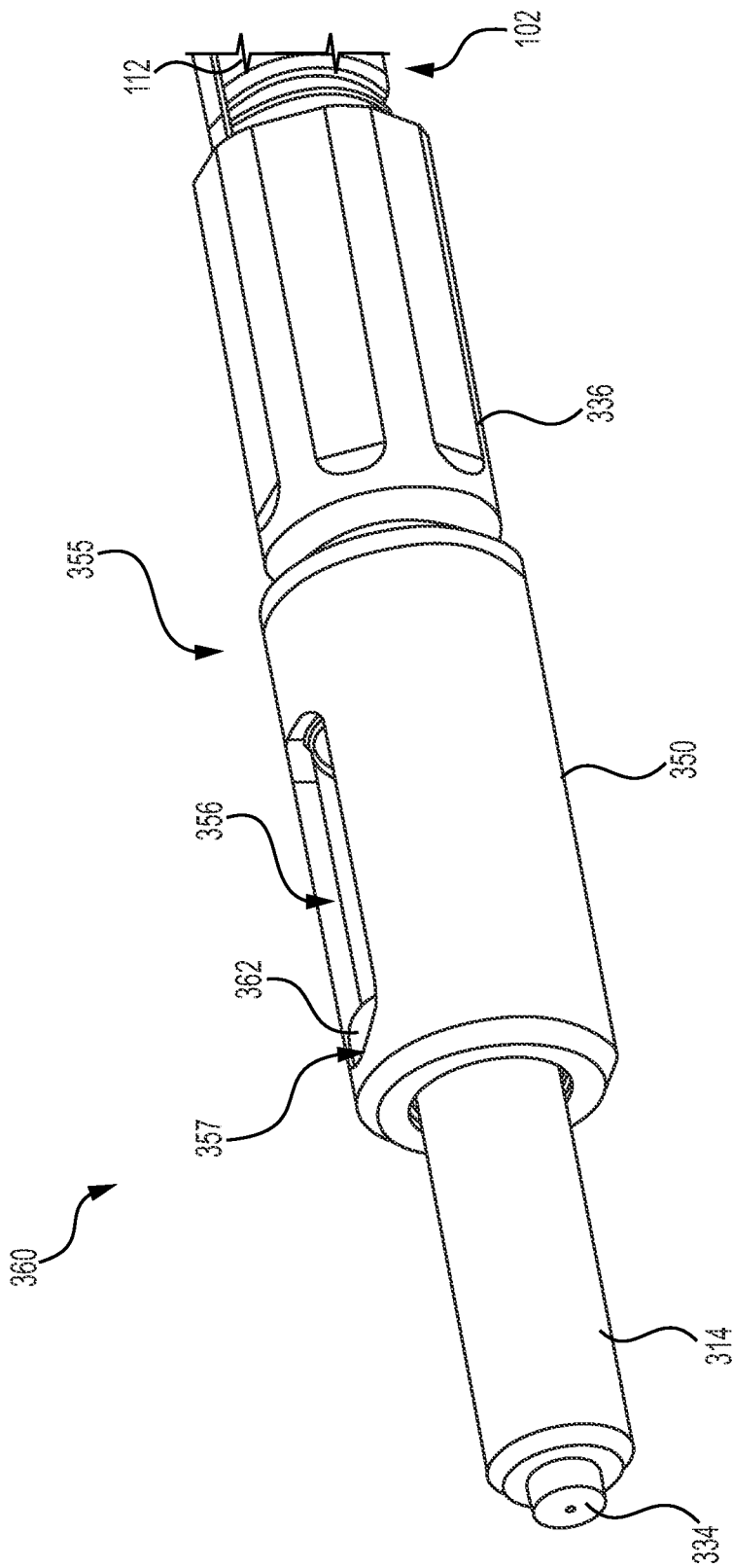
FIG. 8 is a perspective view of an exemplary optical fiber connector sub-assembly in accordance with various aspects of the disclosure terminating an optical fiber cable.
Figure 9:
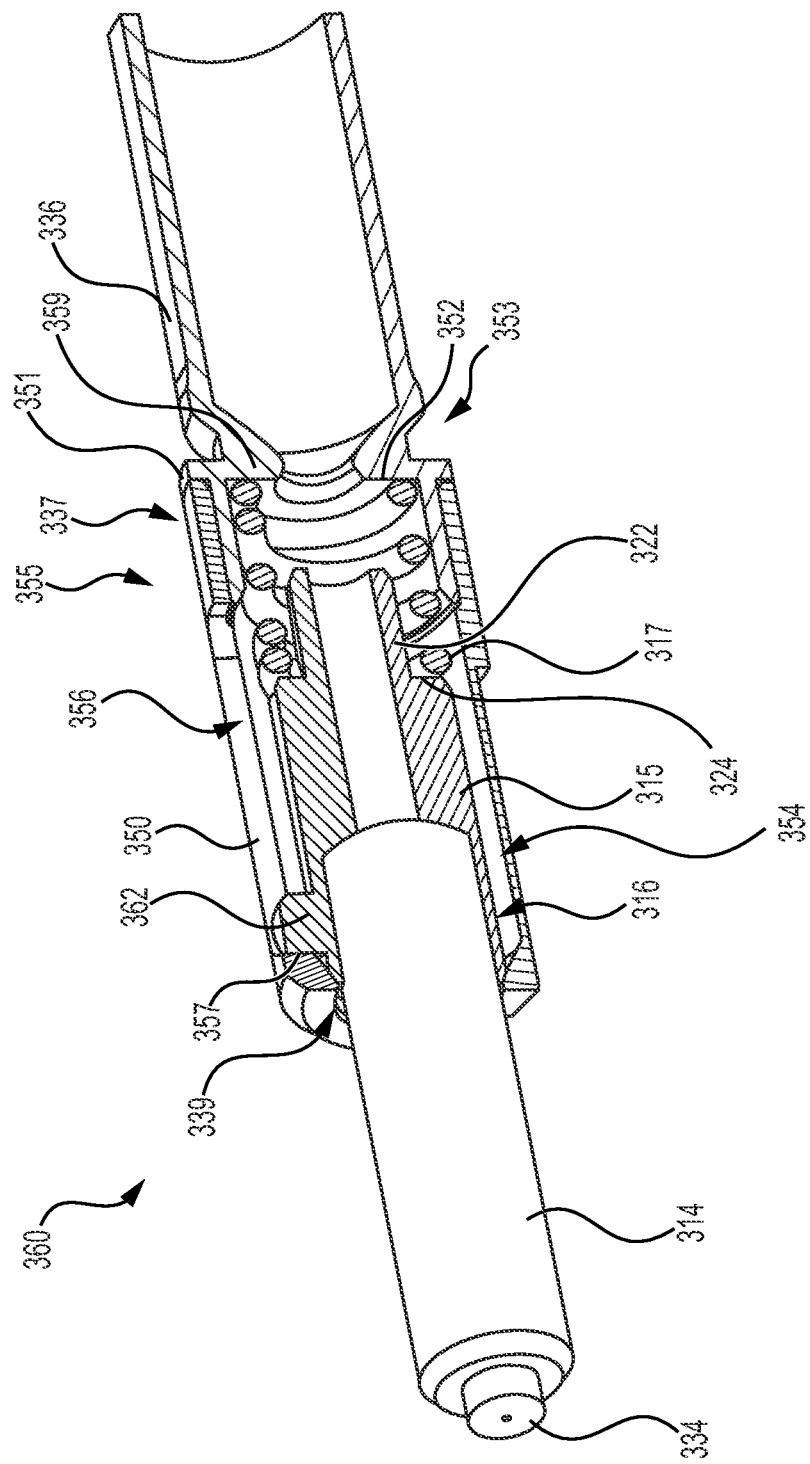
FIG. 9 is a perspective view of the optical fiber connector sub-assembly of FIG. 8 when assembled.

Referring now to FIGS. 6 and 7 (illustrating only the bottom projection 272), a rearward end of the receptacle 232 is bounded by a wall portion 233 having an opening 235 with a dimension that is smaller than a cross-sectional dimension of the receptacle. The projections 272 extend rearward from the wall portion 233 and radially inward from the wall portion 233 of the inner housing 220. The projections 272 include a first portion 276 having a width in a direction transverse to the axial direction that tapers from an inner wall 229 to a second portion 278. The second portion 278 of the projection 272 has a substantially constant width dimension. The first portion 276 and the second portion 278 have a substantially contact radial thickness. The projections 272 include a third portion 280 extending from the second portion 278. The third portion 280 includes a substantially same width dimension as the second portion 278, but the third portion 280 includes a radially thickness that tapers from the second portion 278 to a smaller substantially constant thickness along a majority of a length of the third portion 280. At a rearward end of the third portion 280, the thickness tapers to the inner wall 229 of the inner housing 220. Although only the bottom projection 272 is illustrated, it should be understood that the top wall of the inner housing 220 includes an identical projection.

As a result of the aforementioned structures of the projections 272, the notches 270, and the low regions 266, the inner housing 220 and the ferrule housing 255 are rotatably coupled to one another. As the inner housing 220 is slipped over the ferrule housing 255, the low regions 266 and notches 270 are aligned with the projections 272. A width dimension of the low regions 266 and notches 270 is greater than the width of the second and third portions 278, 280 of the projections 272 to facilitate insertion of the ferrule housing 255 into the inner housing 220. The low regions 266 have a width dimension sized to engage the first tapered portion 276 of the projections 272 so as to be spaced from a rear surface of the wall portion 233 of the receptacle 232. A total length of the first and second portions 276, 278 of the projections 272 is sized to extend through the low regions 266 in the axial direction without entering the notches 270, thus allowing the ferrule basket 216 to slide along the second portion 278 when the ferrule basket 216 slides axially relative to the ferrule housing 255. The third portion 280 has a length that extends into the notches 270, while allowing the inner housing 220 and the ferrule basket 216 to slide axially relative to the ferrule housing 255 without such axial sliding movement being limited by the thicker second portion 278.

The front tube portion 250 has a central aperture (not shown) through which the optical fiber 108 and buffering 110 pass, and has in a rear-most portion the sleeve 236 configured to receive and be crimped to the cable sheathing 112. In some aspects, a strain-relief sleeve (not shown), for example, a boot, may be provided around the junction of the optical fiber cable 102 and the ferrule housing sub-assembly 204.

An outer housing is press-fitted axially over the assembled ferrule housing sub-assembly 204. Once the inner housing 220 and outer housing are engaged together, the inner and outer housings are relatively moveable with respect to each other along the ferrule axis 205 between limits defined by an interaction between the inner housing 220 and the outer housing provided by projections 242 on a pair of opposite sides of the inner housing 220 and a pair of apertures (not shown) in the outer housing. The projections 242 and apertures interact with spring features inside a matching socket (not shown) to provide SC-style push/pull engagement/disengagement configured to mate with an optical fiber socket.

The rotational orientation of the front tube portion 250 may be set at one of four orientations relative to the ferrule 214 in the ferrule basket 214 owing to the seating of the arms 256 in the crenellations 262. In this way, a first rotational key is provided between the ferrule basket 216 and the front tube portion 250 such that the ferrule basket 216 and the front tube portion 250 are rotatably fixed to one another (i.e., are not rotatable relative to one another).

The optical fiber 108 is therefore terminated in a sub-assembly referred to herein as an optical fiber connector sub-assembly 260. The resulting optical fiber connector sub-assembly 260 is therefore mechanically whole or integral, both as regards the components forming the sub-assembly and as regards the mechanical connection of the sub-assembly to the optical fiber cable 102. The front tube portion 250 has an outer diameter which is preferably no more than that of the widest portion of the ferrule basket 216, i.e. the crenellations 262 of the ferrule basket base 215.

After the insertion has been performed, the assembly of the SC-type optical fiber connector 200 is completed as follows. The inner housing 220 is slid in an axial direction over the projecting ferrule 214 and surrounding front tube portion 250. The inner housing 220 includes latches 221 on opposite side walls 223. For example, the latches 221 may be disposed in cutouts 225 in the side walls 223 of the inner housing. The latches 221 may extend forwardly from a rearward wall 227 of the cutouts 225. When the inner housing 220 is slid over the front tube portion 250, the latches 221 are configured to deflect outwardly and when the connecting tube portion 237 of the ferrule housing 255 reaches the latches 221, the latches 221 move inwardly toward the connecting tube portion 237 to a position in the annular groove 238 between the front tube portion 250 and the rear tube portion 236, thereby fixing the position of the ferrule housing 255 relative to the inner housing 220. The external shape of the inner housing 220 where this interacts with the outer housing 240 is the same as or similar to conventional connectors. The outer housing therefore is snap-fitted over the inner housing 220, after which the SC-type connector 200 is fully compatible with conventional connectors and conventional optical fiber sockets.

Referring now to FIGS. 8-12, an exemplary optical fiber connector 300, for example, an SC-type connector, in accordance with various aspects of the disclosure is illustrated and described. The connector 300 includes an optical fiber cable 102, a ferrule housing sub-assembly 304, and an outer housing 340 to provide SC-style push/pull engagement/disengagement with a mating optical fiber socket (not shown).

The ferrule housing sub-assembly 304 includes a cylindrical ceramic ferrule 314, a ferrule basket 316 in which the ferrule 314 is seated, a helical spring 317, a ferrule housing 355, and an inner housing 320. The ferrule housing 355 includes a front tube portion 350 connected with a rear tube portion 336 via a press-fit connection 337. At the press-fit connection 337, the rear tube portion 336 has a smaller outside diameter than the front tube portion 350 such that the rear tube portion 336 is received in the front tube portion 350. The overlap of the front tube portion 350 relative to the rear tube portion 350 is limited by a flange 351 extending radially outward from an outer surface of the rear tube portion 350. At a rearward side of the flange 351 (i.e., on an opposite side of flange 351 relative to the front tube portion 350), the outer surface of the rear tube portion 350 may include an annular groove 353.

The ferrule basket 316 has a base 315 and a cylindrical stem 322 that extends from the base 315 in an axial direction away from the ferrule 314 towards the rear tube portion 336, which is used to make a crimp connection around the optical fiber cable sheathing 112. The spring 317 is seated around a portion of the stem 322 between an annular shoulder 324 on the stem 322 and an annular surface 352 within a cylindrical recess 354 defined by an inwardly-extending wall 359 of the flange 351 at a rearward end of the front tube portion 350. The stem 322 slidably extends through an opening 339 at a forward end of the front tube portion 350. A rearward end of the stem 222 is spaced from the inwardly-extending wall 359, thereby permitting a degree of pivoting movement between the ferrule basket 316 and the ferrule housing 355.

The ferrule basket 316 is configured to be inserted axially into the recess 354 of the front tube portion 350. A top surface of the base 315 has a radially-extending protrusion 362 near a forward end of the ferrule basket. A top surface of the front tube portion 350 has an axially-extending longitudinal slot 356 configured to slidingly receive the protrusion. The aforementioned arrangement permits a degree of axial movement of the ferrule basket 316 and ferrule 314 relative to the front tube portion 350 of the ferrule housing 355, with movement being therefore limited in one direction by the compression of the spring 317 between the two annular surfaces 324, 352 and in the other axial direction by the contact of the protrusion 362 with a forward end wall 357 of the slot 356.

Figure 10:
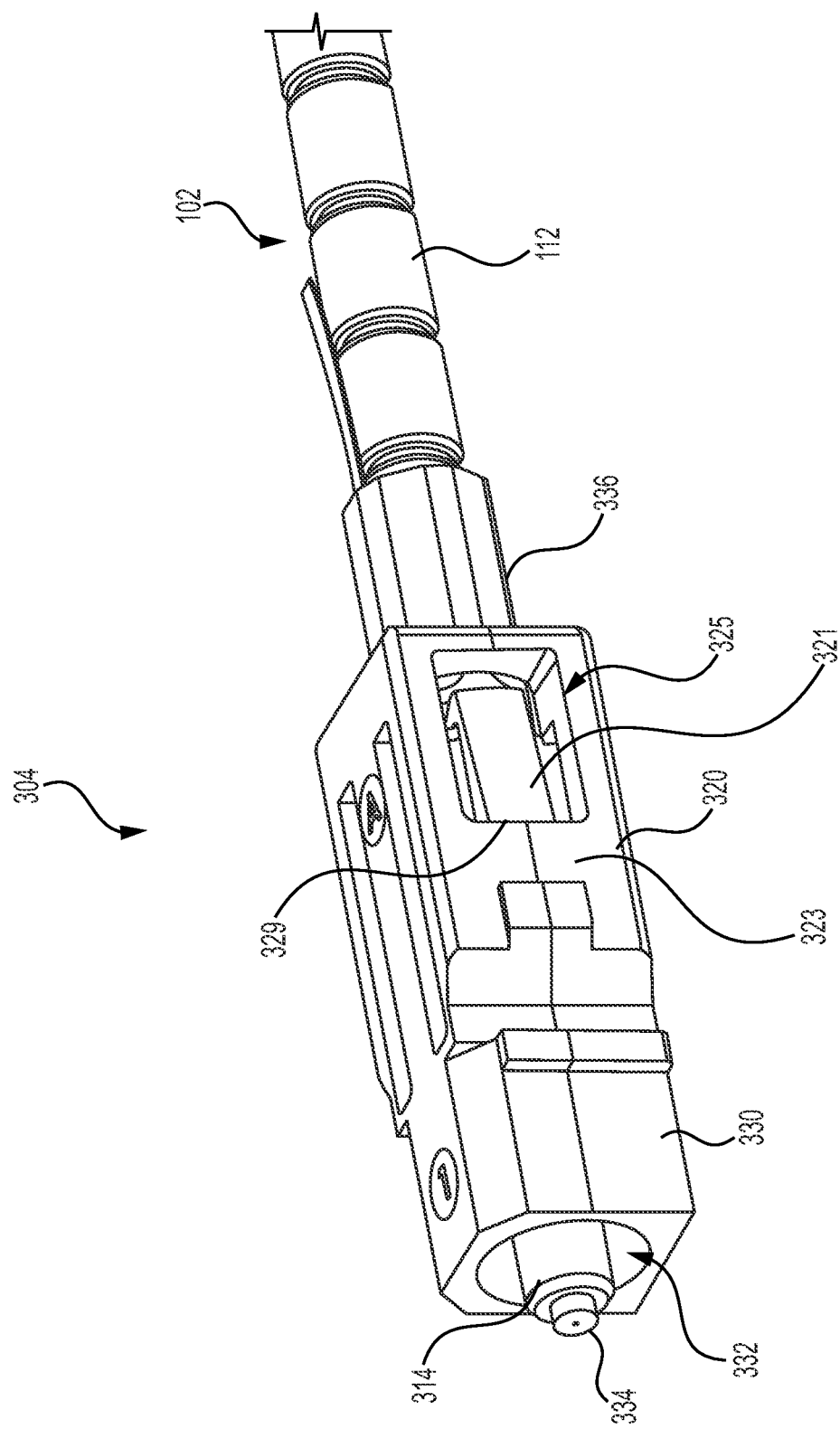
FIG. 10 is a perspective view of an exemplary SC connector including the optical fiber connector sub-assembly of FIG. 8.
Figure 11:
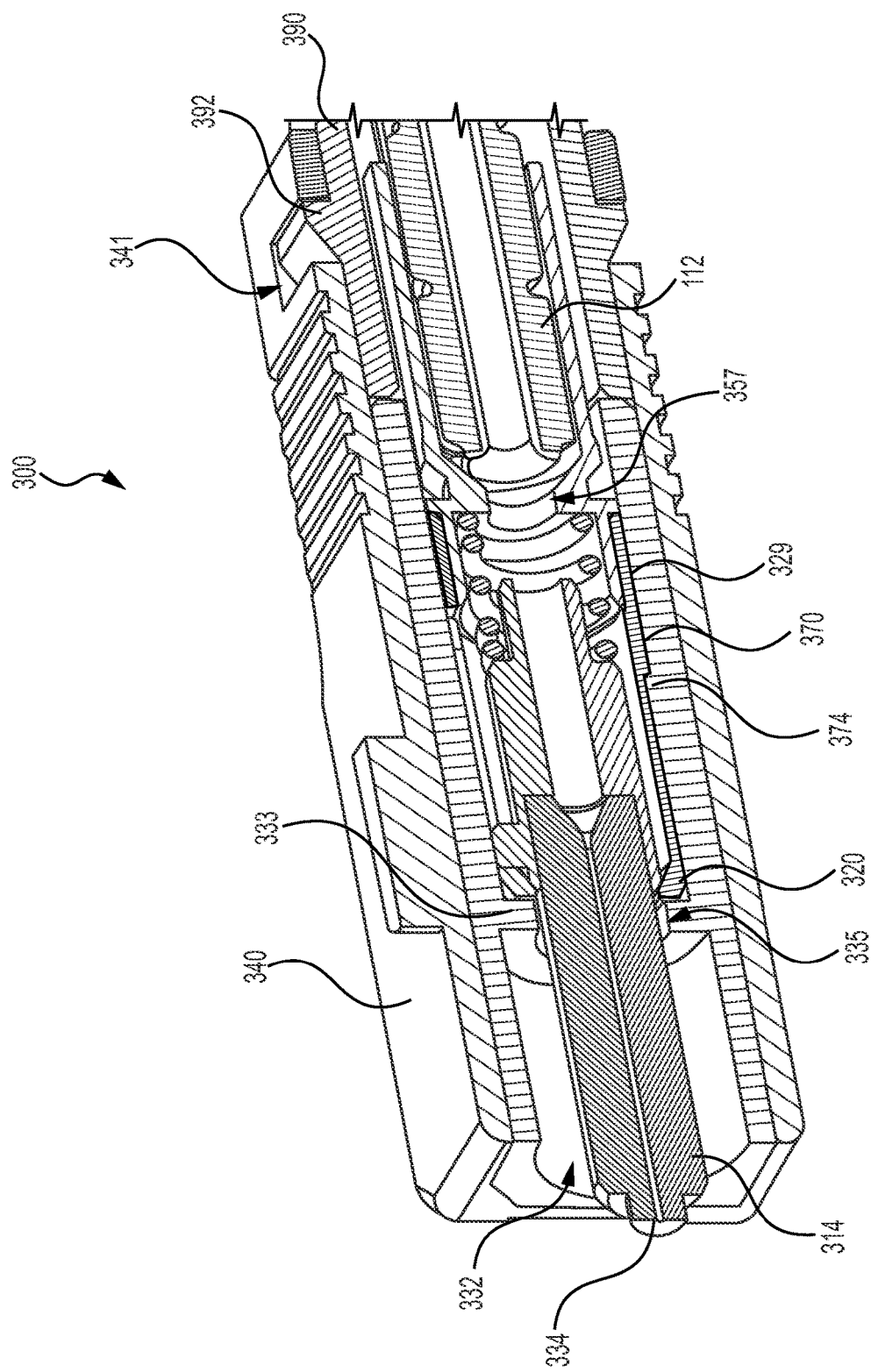
FIG. 11 is a perspective cross-sectional view of the exemplary SC connector of FIG. 10.
Figure 12:
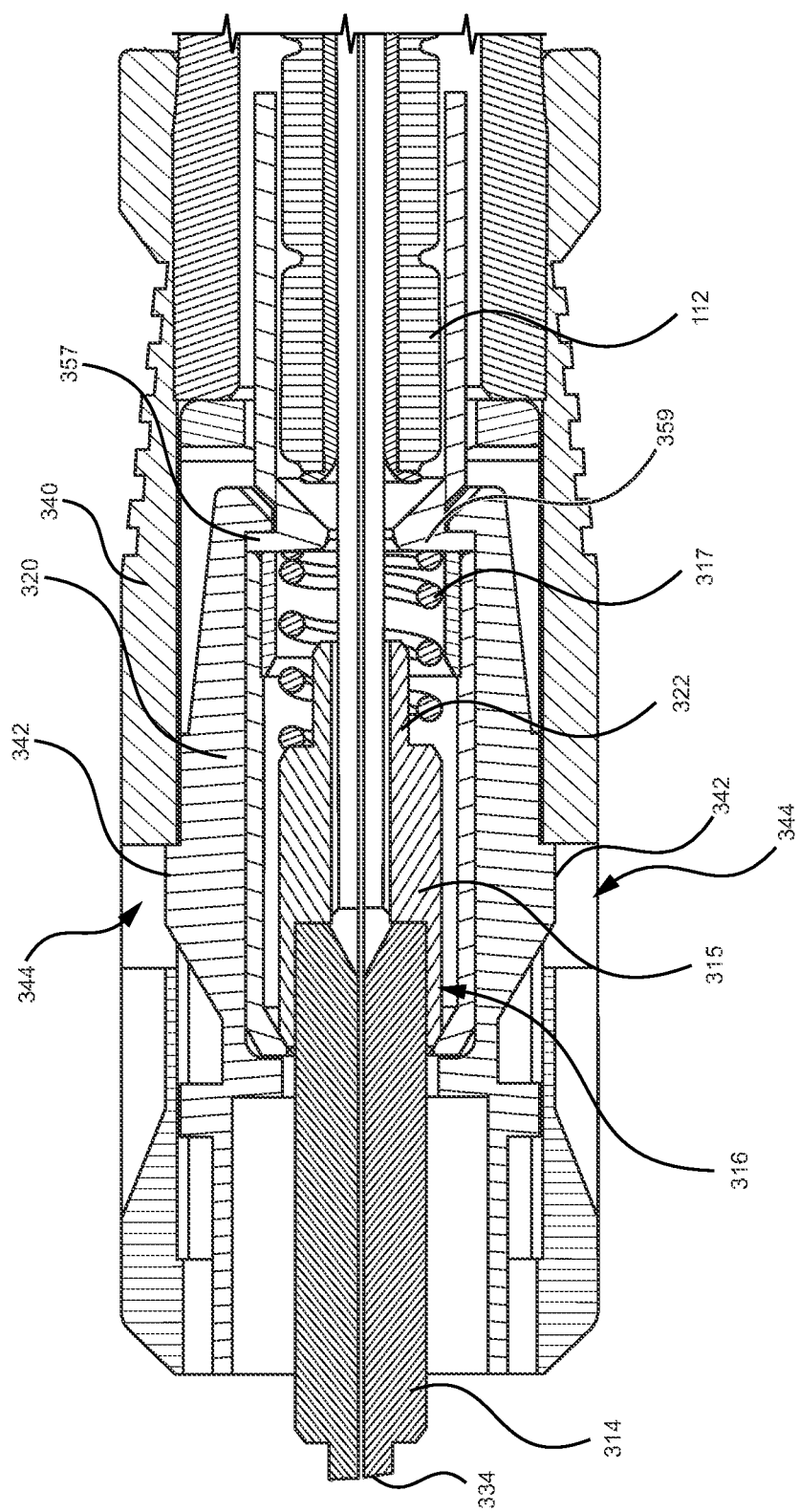
FIG. 12 is a side cross-sectional view of the exemplary SC connector of FIG. 10.

As shown in FIGS. 10-12, the inner housing 320 has a forward portion 330 that coaxially extends around the axially projecting ferrule 314 to define a receptacle 332 for a socket (not shown) configured to receive a projecting portion of the ferrule 314. The ferrule basket 316 is free to move backwards inside the front tube portion 350 and the inner housing 320 when an end face 334 of the ferrule 314 comes into contact with a similar end face (not shown) of another optical fiber ferrule when making an optical connection.

The front tube portion 350 of the ferrule housing 355 may include a longitudinal notch 370 in its bottom outer surface that is keyed to an axially-extending projection 374 on the bottom inner surface of the inner housing 320 to prevent the ferrule housing 355 from rotating relative to the inner housing 320. A rearward end of the receptacle 332 is bounded by a wall portion 333 having an opening 335 with a dimension that is smaller than a cross-sectional dimension of the receptacle 332. The projection 372 extends rearward from the wall portion 333 and radially inward from an inner wall 329 of the inner housing 320. As a result of the aforementioned structures of the projection 372 and the notch 370, the inner housing 320 and the ferrule housing 355 are rotatably coupled to one another. As the inner housing 320 is slipped over the ferrule housing 355, the notch 370 is aligned with the projection 372. The ferrule housing 355 has a central aperture 357 through which the optical fiber 108 and buffering 110 pass, and has in a rear-most portion the rear tube portion 336 configured to receive and be crimped to the cable sheathing 112. A boot 390 is provided around the junction of the optical fiber cable 102 and the ferrule housing sub-assembly 304 and includes at least one projection 392 extending radially outward and configured to be receiving in an opening 341 in an outer housing 340 to interlock the boot 390 with the outer housing 340.

The outer housing 340 may be press-fitted axially over the assembled ferrule housing sub-assembly 304. Once the inner housing 320 and outer housing 340 are engaged together, the inner and outer housings are relatively moveable with respect to each other along the ferrule axis 305 between limits defined by an interaction between the inner housing 320 and the outer housing 340 provided by projections 342 on a pair of opposite sides of the inner housing 320 and a pair of apertures 344 in the outer housing. The projections 342 and apertures 344 interact with spring features inside a matching socket (not shown) to provide SC-style push/pull engagement/disengagement configured to mate with an optical fiber socket.

The rotational orientation of the front tube portion 350 is set to one orientation relative to the ferrule 314 in the ferrule basket 316 owing to the cooperation between the protrusion 362 and the slot 356. In this way, a first rotational key is provided between the ferrule basket 316 and the front tube portion 350 such that the ferrule basket 316 and the front tube portion 350 are rotatably fixed to one another (i.e., are not rotatable relative to one another). The optical fiber 108 is therefore terminated in a sub-assembly referred to herein as an optical fiber connector sub-assembly 360. The resulting optical fiber connector sub-assembly 360 is therefore mechanically whole or integral, both as regards the components forming the sub-assembly and as regards the mechanical connection of the sub-assembly to the optical fiber cable 102.

After the insertion has been performed, the assembly of the SC-type optical fiber connector 300 is completed as follows. The inner housing 320 is slid in an axial direction over the projecting ferrule 314 and surrounding front tube portion 350. The inner housing 320 includes latches 321 on opposite side walls 323. For example, the latches 321 may be disposed in cutouts 325 in the side walls 323 of the inner housing. The latches 321 may extend rearward from a forward wall 329 of the cutouts 325. When the inner housing 320 is slid over the front tube portion 350, the latches 321 are configured to deflect outwardly and when the annular groove 353 of the ferrule housing 355 reaches the latches 321, the latches 321 move inwardly toward the annular groove 353 to a position in the annular groove 353, thereby fixing the position of the ferrule housing 355 relative to the inner housing 320. The external shape of the inner housing 320 where this interacts with the outer housing 340 is the same as or similar to conventional connectors. The outer housing 340 therefore is snap-fitted over the inner housing 320, after which the SC-type connector 300 is fully compatible with conventional connectors and conventional optical fiber sockets.

The disclosure therefore provides a convenient optical fiber connector and optical fiber communication system and method for providing such a system.

Additional embodiments include any one of the embodiments described above, where one or more of its components, functionalities or structures is interchanged with, replaced by or augmented by one or more of the components, functionalities, or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. An optical fiber connector sub-assembly for an optical fiber connector comprising:
   a ferrule that is configured to hold an optical fiber therein along an axis of the connector;
   a ferrule basket that is configured to hold the ferrule at a front portion of the connector;
   a ferrule housing including a front portion that is configured to slidingly receive the ferrule basket and a rear portion that is configured to terminate a fiber optic cable that includes the optical fiber;
   a spring that is configured to be seated between an annular shoulder of the ferrule basket and an annular surface of the ferrule housing;
   an inner housing that is configured to be fixedly coupled with the ferrule housing;
   wherein the ferrule is configured to terminate the optical fiber;
   wherein the ferrule basket, the ferrule housing, and the inner housing are configured to be rotatingly fixed to one another;
   wherein the ferrule basket is configured to slide axially relative to the inner housing;
   wherein the front portion includes a cylindrical portion and two arms extending from a forward end of the cylindrical portion;
   wherein the ferrule basket includes a base portion having two notches that are configured to receive the two arms;
   wherein an outer surface of the front portion includes axially extending notches that are configured to receive projections extending radially inward from an inner wall of the inner housing;
   wherein the ferrule basket includes a stem portion that is configured to extend through an opening in the ferrule housing, and wherein the stem portion includes a flared end portion having a diameter greater than a diameter of the opening; and
   wherein the ferrule basket and the ferrule housing are configured to move axially relative to one another along the connector axis between limits defined by an interaction between the flared end portion of the ferrule holder and a rearward-facing shoulder of the ferrule housing in a first direction and by the spring in a second direction opposite to the first direction such that relative axial movement in the first direction is not limited by the two arms.

2. The optical fiber connector sub-assembly of claim 1, wherein the spring is configured to bias the ferrule away from the ferrule housing along the connector axis.

3. The optical fiber connector sub-assembly of claim 1, wherein outermost surfaces of the ferrule housing and the ferrule basket, relative to the connector axis, lie on a common cylindrical envelope.

4. A Subscriber Connection (SC)-type optical fiber connector comprising:
   the optical fiber connector sub-assembly of claim 2;
   an outer housing;
   wherein the inner housing defines a receptacle for a socket that is configured to receive a projecting portion of the ferrule;
   wherein the spring provided between the ferrule basket and the ferrule housing is configured such that the projecting portion of the ferrule is biased along the connector axis towards the receptacle of the inner housing; and
   wherein the inner housing is configured to be engaged within the outer housing, the inner housing and the outer housing being configured to move relative to each other along the connector axis between limits defined by an interaction between the inner housing and the outer housing in order to provide SC-style push/pull engagement/disengagement with a mating optical fiber socket.

5. The SC-type optical fiber connector of claim 4, wherein the ferrule is configured to be rotationally fixed with respect to the ferrule basket about the connector axis;
   wherein the ferrule basket is configured to be rotationally aligned with respect to the outer housing so that the rotational orientation of the ferrule with respect to the outer housing can be set during assembly of the connector at one of one or more predefined rotational orientations; and
   wherein a first rotational key is provided between the ferrule basket and the ferrule housing, and a second rotational key is provided between the ferrule housing and the inner housing.

6. An optical fiber connector sub-assembly for an optical fiber connector comprising:
   a ferrule holder that is configured to hold the ferrule that is configured to terminate an optical fiber;
   a receiving portion that is configured to slidingly receive the ferrule holder;
   a biasing member that is configured to be seated between the receiving portion and the ferrule holder;
   wherein the ferrule holder and the receiving portion are configured to be rotatingly fixed to one another;
   wherein the ferrule holder is configured to extend through an opening in the receiving portion;
   wherein the ferrule holder is configured to include a flared portion having a size configured to prevent the flared portion from passing through the opening;
   wherein the biasing member is configured to bias the ferrule holder away from the receiving portion; and
   wherein the flared portion is configured to limit axial movement of the ferrule holder away from the receiving portion such that a front portion of the receiving portion does not limit the axial movement of the ferrule holder away from the receiving portion.

7. The optical fiber connector sub-assembly of claim 6, wherein the front portion of the receiving portion is configured to include two engagement structures extending from a forward end of a cylindrical portion.

8. The optical fiber connector sub-assembly of claim 6, wherein the ferrule holder is configured to include two engagement features configured to slidingly receive the two engagement structures.

9. The optical fiber connector sub-assembly of claim 6, further comprising a biasing member provided between the ferrule holder and the receiving portion and configured to bias the ferrule holder away from the receiving portion along a connector axis.

10. The optical fiber connector sub-assembly of claim 6, further comprising an inner housing configured to be fixedly coupled with the receiving portion.

11. The optical fiber connector sub-assembly of claim 10, wherein the inner housing is configured to be rotatingly fixed with the ferrule holder and the receiving portion.

12. The optical fiber connector sub-assembly of claim 10, wherein the ferrule holder is configured to slide axially relative to the inner housing.

13. The optical fiber connector sub-assembly of claim 10, wherein an outer surface of the front portion is configured to receive engagement features that are configured to extend radially inward from an inner wall of the inner housing.

14. A Subscriber Connection (SC)-type optical fiber connector comprising:
- the optical fiber connector sub-assembly of claim 10;
- an outer housing;
- wherein the inner housing defines a receptacle for a socket that is configured to receive a projecting portion of a ferrule held by the ferrule holder;
- wherein a biasing member that is provided between the ferrule holder and the receiving portion is configured to bias the projecting portion of the ferrule along a connector axis towards the receptacle of the inner housing;
- wherein the inner housing is configured to be received by the outer housing; and
- wherein the inner housing and the outer housing are configured to move relative to each other along the connector axis between limits defined by an interaction between the inner housing and the outer housing in order to provide SC-style push/pull engagement/disengagement with a mating optical fiber socket.

15. The SC-type optical fiber connector of claim 14, wherein the ferrule is configured to be rotationally fixed with respect to the ferrule holder about the connector axis; and
- wherein the ferrule holder is configured to be rotationally aligned with respect to the outer housing so that the rotational orientation of the ferrule with respect to the outer housing can be set during assembly of the connector at a predefined rotational orientation.

16. The SC-type optical fiber connector of claim 15, wherein a first rotational key is provided between the ferrule holder and the receiving portion, and a second rotational key is provided between the receiving portion and the inner housing.

17. An optical fiber connector sub-assembly for an optical fiber connector comprising:
- a holding portion that is configured to hold the ferrule that is configured to terminate an optical fiber;
- a receiving portion that is configured to slidingly receive the ferrule the holding portion;
- wherein the holding portion and the receiving portion are configured to be rotatingly fixed to one another;
- wherein the holding portion is configured to extend through an opening in the receiving portion; and
- wherein the holding portion is configured to include a flared portion that is sized larger than the opening and configured to limit axial movement of the holding portion away from the receiving portion such that a front portion of the receiving portion does not limit the axial movement of the holding portion away from the receiving portion.

18. The optical fiber connector sub-assembly of claim 17, wherein the front portion of the receiving portion is configured to include two engagement structures extending from a forward end of a cylindrical portion.

19. The optical fiber connector sub-assembly of claim 17, wherein the holding portion is configured to include two engagement features configured to slidingly receive the two engagement structures.

20. The optical fiber connector sub-assembly of claim 17, further comprising a biasing member that is provided between the holding portion and the receiving portion and configured to bias the holding portion away from the receiving portion along a connector axis.

21. The optical fiber connector sub-assembly of claim 17, further comprising an inner housing that is configured to be fixedly coupled with the receiving portion.

22. The optical fiber connector sub-assembly of claim 21, wherein the inner housing is configured to be rotatingly fixed with the holding portion and the receiving portion.

23. The optical fiber connector sub-assembly of claim 21, wherein the holding portion is configured to slide axially relative to the inner housing.

24. The optical fiber connector sub-assembly of claim 21, wherein an outer surface of the front portion is configured to receive engagement features that are configured to extend radially inward from an inner wall of the inner housing.

25. A Subscriber Connection (SC)-type optical fiber connector comprising:
- the optical fiber connector sub-assembly of claim 21;
- an outer housing;
- wherein the inner housing defines a receptacle for a socket that is configured to receive a projecting portion of a ferrule held by the holding portion;
- wherein a biasing member that is provided between the holding portion and the receiving portion is configured to bias the projecting portion of the ferrule along a connector axis towards the receptacle of the inner housing;
- wherein the inner housing is configured to be received by the outer housing; and
- wherein the inner housing and the outer housing are configured to move relative to each other along the connector axis between limits defined by an interaction between the inner housing and the outer housing in order to provide SC-style push/pull engagement/disengagement with a mating optical fiber socket.

26. The SC-type optical fiber connector of claim 25, wherein the ferrule is configured to be rotationally fixed with respect to the holding portion about the connector axis; and
- wherein the holding portion is configured to be rotationally aligned with respect to the outer housing so that the rotational orientation of the ferrule with respect to the outer housing can be set during assembly of the connector at a predefined rotational orientation.

27. The SC-type optical fiber connector of claim 26, wherein a first rotational key is provided between the holding portion and the receiving portion, and a second rotational key is provided between the receiving portion and the inner housing.

* * * * *